United States Patent [19]

Kolomeets et al.

[11] Patent Number: 4,866,360
[45] Date of Patent: Sep. 12, 1989

[54] CUTTING PROCESS CONTROL SYSTEM FOR CNC METAL CUTTING MACHINE TOOLS

[76] Inventors: Sergei D. Kolomeets, pereulok Mikhailovsky, 7, kv. 20; Alexei J. Krivoshlykov, bulvar Lesi Ukrainki, 20, kv. 40; Vladimir A. Ostafiev, ulitsa Smolenskaya, 5/I, kv. 36; Grigory S. Tymchik, pereulok Kirovogradsky, 6, kv. I, all of Kiev, U.S.S.R.

[21] Appl. No.: 153,266
[22] PCT Filed: Feb. 20, 1986
[86] PCT No.: PCT/SU86/00014
 § 371 Date: Oct. 19, 1987
 § 102(e) Date: Oct. 19, 1987
[87] PCT Pub. No.: WO87/04960
 PCT Pub. Date: Aug. 27, 1987
[51] Int. Cl.⁴ ............ G05B 19/33; G05B 19/29
[52] U.S. Cl. ................. 318/577; 318/569; 318/600
[58] Field of Search ........ 318/575, 576, 577, 569, 318/600; 51/165.71; 408/16; 409/80

[56] References Cited

U.S. PATENT DOCUMENTS

| | | | |
|---|---|---|---|
| 4,234,837 | 11/1980 | Winslow | 318/576 X |
| 4,276,503 | 6/1981 | Peiffert et al. | 318/576 |
| 4,493,968 | 1/1985 | Brown | 318/577 X |
| 4,497,996 | 2/1985 | Libby et al. | 318/577 X |
| 4,588,339 | 5/1986 | Bilz | 409/80 X |

FOREIGN PATENT DOCUMENTS 0123602 10/1984 U.S.S.R. ............ 51/165.71

Primary Examiner—Bentsu Ro
Attorney, Agent, or Firm—Lilling & Greenspan

[57] ABSTRACT

The invention relates to optoelectronic instrumentation engineering and, in particular, to cutting process control systems for CNC machine tools. A control system includes an optical transducer (2) mounted on a carriage (1) of a machine tool in the zone of movement of a cutting tool (8) and made up of a laser (10), and, mounted in the path of a beam (10') of said laser (10), a narrow-field slit diaphragm (12), a reference half plane (13) arranged in the plane of an axis (15) of rotation of a workpiece (9), a Fourier lens (19), and an electronic interface unit (3). The reference half plane (13) is located on the side opposite an apex (8') of a cutting wedge of the tool (8) in relation to the workpiece (9) so as to define an optically transparent slit (16) with the profile of a surface (17) of the workpiece (9). The electronic interface unit (3) comprises a memory (21) coupled in series with a switching circuit (23), which are installed between an image receiver (20) and an analog-to-digital converter (24), and, also connected in series, a differentiating circuit (22), whose input is connected to an amount of the image receiver (20) and a pulse former (25) whose outputs are connected to the memory (21) and the switching circuit (23).

1 Claim, 4 Drawing Sheets

CUTTING PROCESS CONTROL SYSTEM FOR CNC METAL CUTTING MACHINE TOOLS

BACKGROUND OF THE INVENTION

1. Field of the Invention

The invention relates to the optoelectronic instrumentation engineering and data processing and measurement technology, and in particular it deals with cutting process control systems for CNC (computer numerical control) metal cutting machine tools.

2. Description of the Prior Art

Known in the art is an apparatus (SU, A, 772730) for controlling a machine-jig-tool-work system comprising a long feed drive, a comparator, and a negative feedback control channel, the apparatus being designed for correcting the relative position of the tool and workpiece and thickness of the removed layer.

However, the metal machining process is only controlled by indirect parameters of elastic deformation of individual members of the machine-jig-tool-work system without taking into account wear of the tool and kinematic errors in the servo drives of the carriage so that the accuracy of manufacture of parts is low. In addition, roughness of the workpiece surface is not controlled so that the machining process is not adaptive to the part quality.

The closest known prior art is an apparatus (SU, A, 1076859) for controlling the cutting process, comprising an optical transducer mounted on a metal cutting machine tool in the zone of a tool movement, the transducer comprising a laser, a narrow-field slit diaphragm mounted in the path of the laser beam, a reference half plane extending in the plane of the axis of rotation of the workpiece, a Fourier lens and an electronic interface unit comprising a series circuit including an image receiver and an analog-to-digital converter connected to the input of a CNC device.

The apparatus is designed for measuring the amount of dimensional wear of the cutting tool and for automatically compensating for such wear by effecting the cross feed of the tool by moving the carriage by the amount of the dimensional wear.

This apparatus does not, however, allow the kinematic error in servo drives of the carriage to be controlled; roughness of the part surface is not controlled, and the carriage position is only controlled in accordance with wear of the tool.

SUMMARY OF THE INVENTION

The invention is to provide a cutting process control system for CNC metal cutting machine tools, wherein the structural arrangement of an optical transducer and electronic interface unit allows direct measurement of diameter and roughness of the profile of the workpiece surface.

This object is achieved by a cutting process control system for CNC metal cutting machine tools, comprising an optical transducer mounted on a metal cutting machine tool in the zone of movement of a tool, the transducer comprising a laser, a narrow-field slit diaphragm mounted in the path of the laser beam, a reference half plane extending in the plane of the axis of rotation of the workpiece, a Fourier lens, and an electronic interface unit comprising a series circuit including an image receiver and an analog-to-digital converter connected to the input of a CNC device. According to the invention, the optical transducer is mounted on a carriage of the metal cutting machine tool, and the reference half plane is disposed on the side opposite to the apex of the cutting wedge of the tool with respect to the workpiece so as to define, with the profile surface of the workpiece, an optically transparent slit, the length of the reference half-plane being equal to the nipping radius of the beam of the laser enabling a two-mode generation, and the electronic interface unit comprises a series circuit including a memory and a switching circuit connected between the image receiver and the analog-to-digital converter as well as a series circuit including a differentiating circuit having an input connected to the output of the image receiver and a pulse former having its outputs connected to the memory and the switching circuit.

The invention makes it possible to improve quality of manufactured parts owing to a continuous control of their diameter with a maximum error of 2 $\mu$m and control of roughness of the surface being machined within the range of microrelief from 2 $\mu$m to 40 $\mu$m. The speed of the machine tool programmed numerical control system is also improved owing to an increase in the speed of forming of control commands and a reduction of the processor memory volume owing to the preliminary analog processing of the output video signal of the image receiver in the electronic interface unit. These advantages make it possible to use the cutting process control system in metal cutting machine tools within the frameworks of flexible automated production.

BRIEF DESCRIPTION OF DRAWINGS

The invention will now be described with reference to the accompanying drawings, in which.

DESCRIPTION OF THE PREFERRED EMBODIMENT

Figure 1:
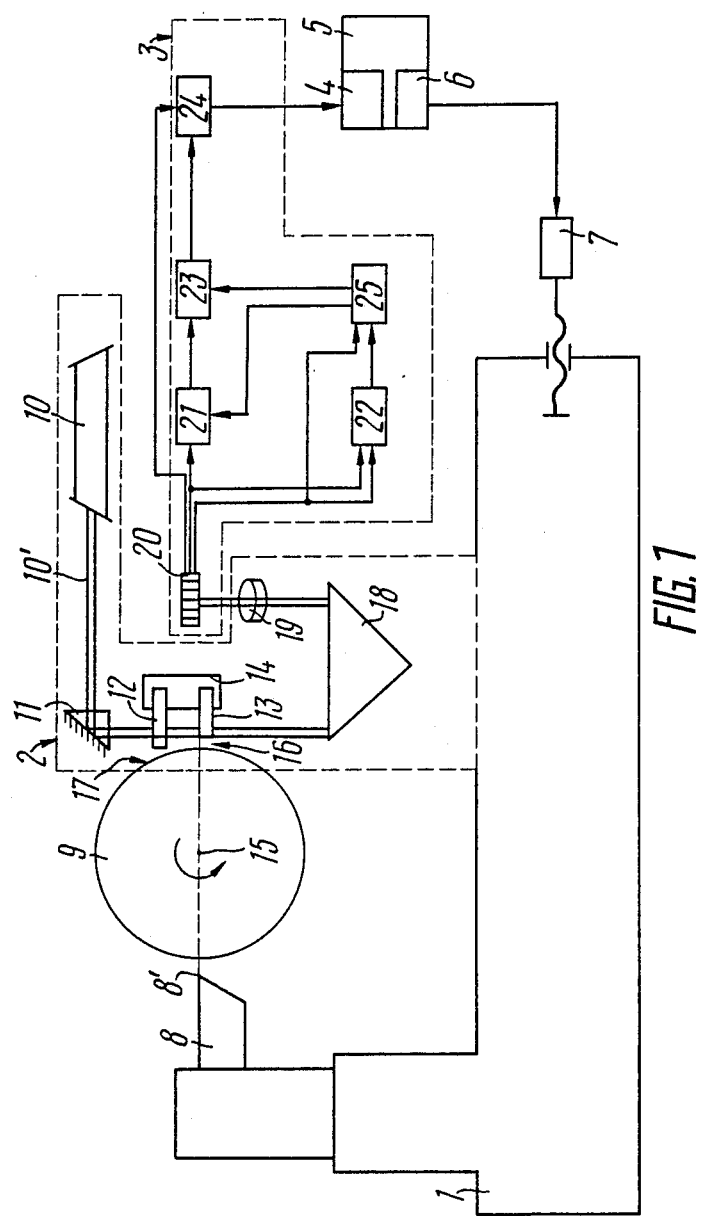
FIG. 1 shows a block-diagram of a cutting process control system for CNC metal cutting machine tools according to the invention.

A cutting process control system for CNC metal cutting machine tools, e.g. for latches with CNC devices comprises a carriage 1 (FIG. 1) of a metal cutting machine tool which supports an optical transducer 2 connected, via a single interface unit 3, to an input of a processor 4 of a CNC device 5 having its own interface unit 6 connected to a servo drive 7 of the metal cutting machine tool which carries out displacements of the carriage 1 supporting a cutting tool 8 designed for machining a workpiece 9. The optical transducer 2 comprises a laser 10 which is a source of a coherent beam 10' of radiation, a deviating prism 11 mounted in the path of the beam, a narrow-field slit diaphragm 12 mounted at the outlet of the prism, and a reference half plane 13. The reference half plane 13 is secured in a holder 14, the reference half plane 13 extending in a plane (shown with a dash-and-dot line) of the axis of rotation 15 of the workpiece 9 so as to define with the profile surface 17 of the workpiece an optically transparent slit 16 on the opposite side of the workpiece 9 with respect to an apex 8' of the cutting wedge of the tool 8 located in the same plane. Downstream the reference half plane 13 in the direction of the radiation beam 10' there are mounted in series a deviating rectangular prism 18 and a Fourier lens 19 having a focal plane in which is disposed an image receiver 20 of the electronic interface unit 3. The image receiver 20 is built around a single-coordinate line of charge-coupled photodetectors. One input of the image receiver 20 is connected in parallel with the input of a memory 21 and differentiating circuit 22. The output of the memory 21 is connected, via a switching circuit, to one input of an analog-to-digital converter 24, and the output of the differentiating circuit 22 is connected to one input of a former 25 having its outputs connected to the remaining inputs of the memory 21 and switching circuit 23. Another output of the receiver 20 is connected in parallel with the remaining inputs of the differentiating circuit 22 and former 25, and the remaining output of the receiver 20 is connected to another input of the analog-to-digital converter 24 having its output connected to the input of the processor 4 of the CNC device 5.

Figure 2:
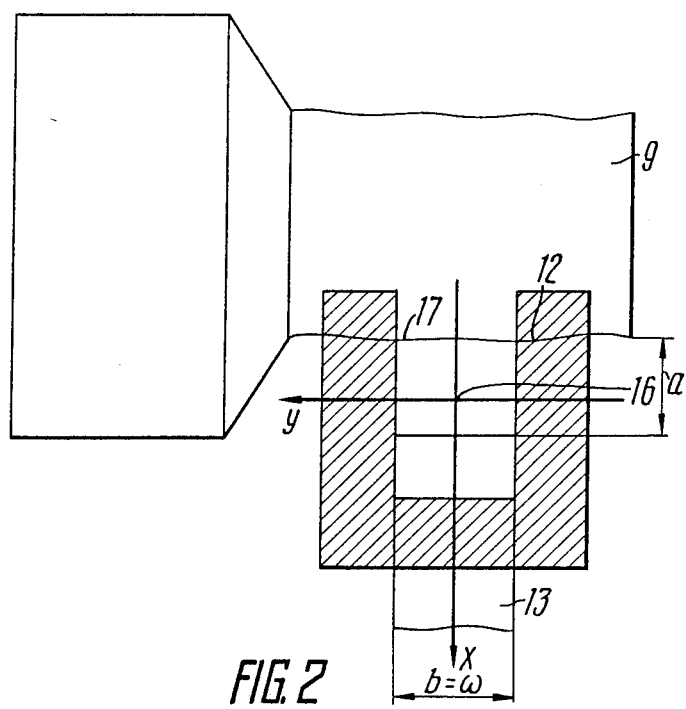
FIG. 2 shows a top view of a measurement slit defined by the reference half plane and the profile surface of a workpiece, according to the invention.

FIG. 2 shows a plan view (in the direction of the radiation beam 10') of the measurement slit 16 defined by the reference half plane 13 and the profile 17 of the workpiece 9. Therefore, the width "a" of the measurement slit 16 is equal to the distance from the reference plane 13 to the profile surface 17 of the workpiece 9, and the width "b" of the reference half plane 13 is equal to the length of the measurement slit 16 and to the nipping radius "ω" of the beam 10' (FIG. 1) of radiation of the laser 10.

Figure 3:
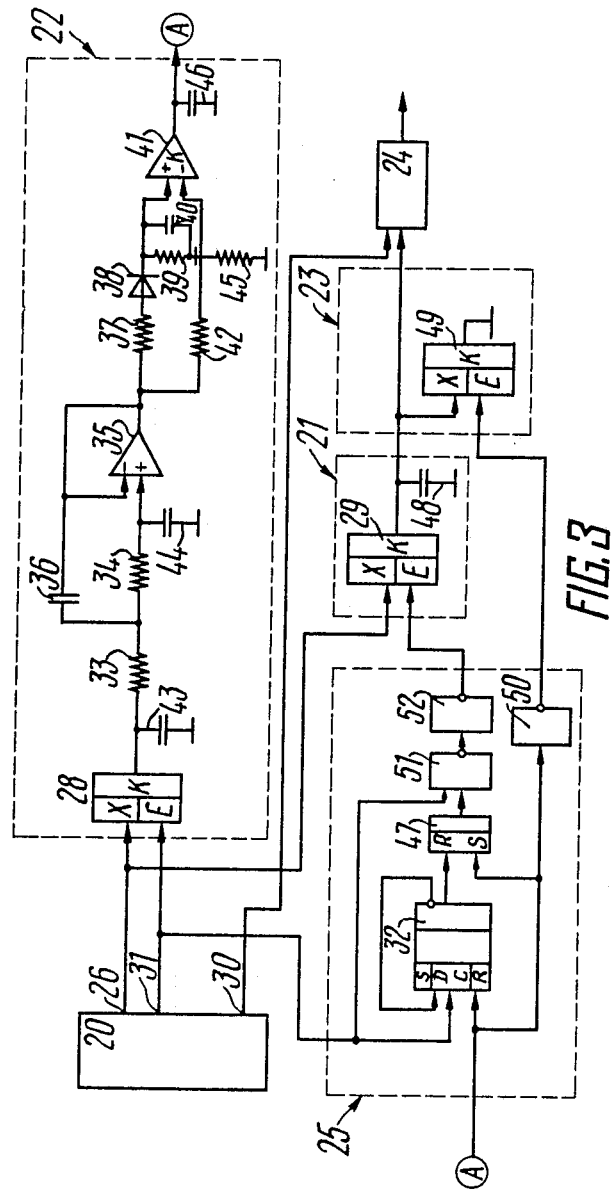
FIG. 3 shows an electrical circuit diagram of an interface unit, according to the invention.

FIG. 3 shows an electrical diagram of the electronic interface unit 3. Here an output 26 of the video signal of the image receiver 20 is connected to the X input of a switch 28 of the differentiating circuit 22 and to the X input of a switch 29 of the memory 21. An output 30 of video signal sweep clocks of the receiver 20 is connected to the triggering input of the analog-to-digital converter 24, and an output of interrogation pulses of photodetectors of the image receiver 20 is connected to the C input of a T-flip-flop 32 of the former 25 and to the E input of the switch 28 of the differentiating circuit 22. The output of the switch 28 is connected, via a resistor circuit 33, 34 to a positive input of an operational amplifier 35 having its output connected to its negative input and, via a capacitor 36, is connected to a junction point of the resistors 33, 34. In addition, the output of the operational amplifier 35 is connected, via a resistor 37, diode 38, an RC-circuit including a resistor 39 and a capacitor 40, to a positive input of a comparator 41 and, via a resistor 42, to the negative input of the comparator 41. The output of the switch 28 is connected, via a capacitor 43, to the positive input of the operational amplifier 35 is connected, via a capacitor 44, and the negative input of the comparator 41 is connected, via a resistor 45, and its output is connected, via a capacitor 46, to a common bus of the electronic interface unit 3. The output of the comparator 41 is connected to the R input of the T-flip-flop 32 and to the S input of a flip-flop 47 having its R-input connected to the non-inverted output of the T-flip-flop 32 having its interface output connected to the D input thereof. The output of the switch 29 is connected to the data input of the analog-to-digital converter 24 and, via a capacitor 48, to the common bus of the electronic interface unit 3. The X input of a switch 49 of the switching circuit 23 is connected to the output of the switch 29 and its E input is connected, via an inverter 50, to the output of the comparator 41. The data input of the analog-to-digital converter 24 is connected to the X input of the switch 49. In addition, the output of the flip-flop 47 is connected, via an AND gate 51 and an inverter 52, to the E input of the switch 29, and the second input of the AND gate 51 is connected to the C input of the T-flip-flop 32.

Figure 4:
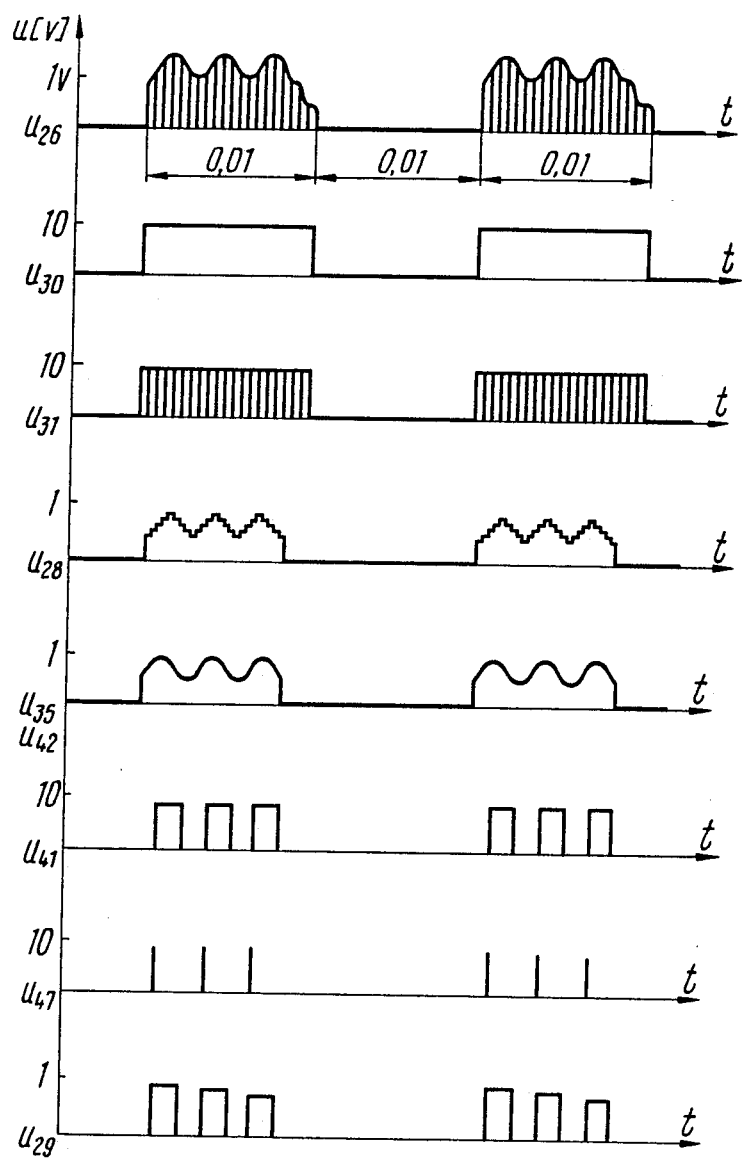
FIG. 4 shows voltage waveforms at various points of the interface unit, according to the invention.

FIG. 4 shows voltage waveforms at certain points of the electronic interface unit 3 to explain operation of the unit. Time "t" in seconds is plotted on the abscissa and voltage "U" in volts is plotted on the ordinates, and the points in the electrical diagram are referenced similarly to respective circuit elements.

The operation of the cutting process control system for CNC metal cutting machine tools will now be described. The workpiece 9 is chucked in a metal cutting machine tool, and the cross feed of the cutting tool 8 is effected by means of the carriage 1 to obtain a desired diameter of the workpiece so that the workpiece is machined. In a time interval programmed in the CNC device 5, the tool is moved away from the surface 17 of the workpiece at a distance such that the optically transparent measurement slit 16 (FIG. 2) about 50 to 1000 μm wide is formed between the profile surface 17 of the workpiece and the reference half plane 13. The amount of the cross feed of the carriage 1 is measured by the mechanism of the servo drives 7 of the metal cutting machine tool, and the actual width "a" of the slit 16 is checked-up against the output signal of the image receiver 20 by means of digital processing of the video signal in the processor 4 of the CNC device 5. Deviation of the diameter of the workpiece 9 from the desired dimensions lengthwise thereof is determined by moving axially the reference half plane 13 by means of the carriage 1 relative to the profile surface 17 of the workpiece 9. Barrel shape, taper and other profile distortions of the surface 17 of the workpiece 9 will cause proportional changes in the width of the slit 16 "a" during the movement of the carriage 1 along the workpiece 9.

When the reference half plane 13 moves along the profile surface 17 of the workpiece 9, the optical system of the optical transducer 2 forms a diffraction image (pattern) of the measurement slit 16 in the image receiver 20. A section along the coordinate $f_y=0$ of the distribution of illumination of the diffraction pattern of the transparent slit 16 is described as follows:

$$E(f_x, O) = \frac{E_o \cdot b^2}{4\pi^2\lambda^2 f^2 f_x^2} \cdot \{1 + I_o^2 (2\pi A f_x) - 2I_o (2\pi A f_x)\cos 2\pi a f_x\}, \quad (1)$$

wherein a is the width of the transparent measurement slit 16; A is the rms height of microrelief (roughness) of the profile surface 17 of the workpiece 9; b is the length of the measurement slit 16 equal to the nipping radius ω of the radiation beam 10' of the laser 10; $E_o$ is the illumination of the transparent slit; $f_x$ is the three-dimensional frequency in the plane of the diffraction pattern in the image receiver 20.

Analysis of the Eq. (1) shows that distribution of illumination in the diffraction pattern of the transparent slit 16 represents equidistantly located peaks of the light flux, the spacing of the peaks $x_f$ being inversely proportional to the width "a" of the measurement slit 16 and equal to $$x_f = \frac{\lambda 1}{a}, \quad (2)$$

wherein λ is the laser wavelength; 1 is the distance from the Fourier lens 19 to the image receiver 20. The amplitude $E_m$ of individual peaks is determined by the value A of roughness of the surface 17 of the workpiece 9 and is described as follows:

$$E_m = \frac{E_o \cdot a^2 \cdot b^2}{\pi^2 \lambda^2 f^2 (2m+1)^2} \cdot \left(1 + I_o \frac{\pi A}{a(2m+1)}\right)^2, \quad (3)$$

wherein m is the ordinal number of a peak. Analysis of Eq. (3) shows that with an increase in roughness A of the surface 17 of the workpiece 9 from zero amplitudes $E_m$ of all peaks of the diffraction pattern of the slit 16 decrease, hence contrast thereof decreases.

Therefore, by measuring the distance between two randomly selected peaks of the diffraction pattern of the transparent measurement slit 16, its width "a" can be computed using Eq. (2), i.e. deviation of the diameter of the workpiece 9 from its nominal (desired) value can be obtained. Roughness A of the surface 17 of the workpiece 9 is determined by computing the ratio (to avoid influence of fluctuations of power of the laser 10) of amplitudes of two randomly selected peaks of the diffraction pattern of the transparent measurement slit 16 described by Eq. (3). These operations are carried out in accordance with a program by means of the processor 4 of the CNC device 5 by way of digital processing of the video signal read-out at the output 26 of the image receiver 20 and fed to the processor 4 through the electronic interface unit 3.

To increase the speed of reading-out of the video signal by the analog-to-digital converter 24, the video signal (waveform $U_{26}$ in FIG. 4) is concurrently fed to the data input X of the switch 28 of the differentiating circuit 22 and to the X-input of the switch 29 of the memory 21. The video signal is in the form of a regularly repeated train of amplitude-modulated pulses modulated by the light flux incident upon the image receiver 20 in the diffraction pattern of the transparent slit 16. The number of data pulses in the train is equal to the number of photodetectors in the image receiver 20, and amplitudes of the pulses are proportional to the light flux incident upon respective photodetectors of the image receiver 20. Pulses $U_{31}$ (FIG. 4) of interrogation of the photodetectors of the image receiver 20 are fed to the E-input of the switch 28, these pulses having their edges coinciding with those of the pulses $U_{26}$ of the video signal of photodetectors of the image receiver 20. Therefore, a stepped evelope of the video signal is formed on the capacitor 43 connected to the output of the switch 28 as shown in the waveform $U_{28}$ in FIG. 4. The operational amplifier 35 with the capacitors 36, 44 and resistors 33, 34 is a Butterworth filter of the lower second-order frequencies for smoothing the stepped video signal (waveform $U_{35}$ of the output signal of the operation amplifier 35 is shown in FIG. 4). This signal $U_{35}$ goes, via the integrating circuit in the form of the resistor 37 and diode 38 as well as the resistor 39 and capacitor 40, to the positive input of the comparator 41. The smoothed video signal $U_{42}$ is fed to the negative input of the comparator 41 via a divider consisting of the resistors 42, 45. Trains of pulses (see waveform $U_{41}$ in FIG. 4) are formed at the output of the comparator 41, each having its edges coinciding with the positions of two adjacent peaks of the signal $U_{35}$, the leading edge coinciding with the position of maximum and the trailing edge, with the position of minimum. The leading edge of pulses $U_{41}$ sets the T-flop-flop 32 and the flip-flop 47. At the same time, pulses $U_{31}$ of interrogation of the photodetectors (see waveform $U_{31}$ in FIG. 4) of the image receiver 20 are fed to the C input of the T-flip-flop 32. It should be noted that there is no signal (zero) at the non-inverting output of the T-flip-flop 32 when the leading edge of the pulse $U_{41}$ and the leading edge of the pulse $U_{31}$ arrive, and with the arrival of the next pulse $U_{31}$ a unity amplitude pulse is formed to reset the flip-flop 47. Therefore, pulses (see waveform $U_{47}$ in FIG. 4) are formed at the output of the flip-flop 47 which are fed, via the AND gate 51 and inverter 52, to the E input of the switch 29. Pulses $U_{31}$ of interrogation of the photodetectors are fed to the second input of the AND gate 51 so as to obtain at the output of the inverter 52 pulses of a length equal to that of pulses $U_{31}$ of interrogation of the photodetectors, the time position of these pulses corresponding to the position of the peaks of the video signal $U_{26}$. Pulses of signal (see waveform $U_{29}$ in FIG. 4) are formed at the output of the switch 29 connected, via the capacitor 48, to the common bus of the electronic interface unit 3, the amplitude of each pulse $U_{29}$ being equal to the amplitude of the peak of the video signal $U_{26}$ coinciding therewith in position, and the length is formed by the switching circuit 23. This signal goes to the data input of the analog-to-digital converter 24 and is put, in a digital code, to the processor 4, the analog-to-digital converter 24 being triggered by the leading edge of every only once read-out pulse of the signal $U_{29}$. Therefore, the read-out amplitude of each pulse of the signal $U_{29}$ corresponds to the amplitude of the peak of the video signal $U_{26}$ which coincides therewith in position, and the time interval between the two adjacent read-outs is proportional to the period of oscillations of amplitude of the video signal $U_{26}$ at the output of the image receiver 20. The width "a" of the transparent measurement slit 16 and the amplitude A of roughness of the surface 17 of the workpiece 9 are computed using the abovedescribed Equations (2) and (3).

If the diameter of the workpiece 9 deviates from the nominal value, the width "a" of the transparent measurement slit 16 will change proportionally, the numerical value of deviation being determined in accordance with the abovedescribed equations on the basis of the average period of oscillations of the video signal $U_{26}$. To obtain the desired (nominal) diameter of the workpiece 9, the cross feed of the cutting tool 8 is effected by the carriage 1 through a distance of the residual allowance. With an increase in roughness A of the surface 17 of the workpiece 9, the CNC device 5 will form a command to lower the speed of cross feed of the tool so as to improve quality of the surface 17 of the workpiece 9. Therefore, the control system according to the invention allows the adaptive correction of cutting conditions to be effected by directly controlling quality of a part being manufactured with respect to the diameter (dimension) and roughness of the part surface.

Advantages of the control system for controlling cutting process according to the invention over prior art reside in that influence of kinematic errors in servo drives of the carriage, dynamic deformations in the system machine-jig-tool-work, dimensional wear of cutting tools and errors in positioning of the cutting tool is automatically eliminated by means of a direct non-contact checking of the workpiece diameter so as to improve accuracy of manufacture of parts up to 2 μm in carrying out turning of metal workpieces within the frameworks of flexible automatic production. In addition, workpiece surface roughness control is also ensured with correction of cutting conditions for lowering the roughness.

The invention may be used in the metal machining and in the machine tool engineering for controlling cutting process in CNC metal machining latches within the frameworks of flexible automated production.

We claim:

1. A cutting process control system for CNC metal cutting machine tools, comprises:

an optical transducer mounted on a metal cutting machine tool in the zone of movement of a cutting tool, said optical transducer including a laser, a narrow-field slit diaphragm mounted in the path of a radiation beam from said laser, a reference half plane extending in the plane of the axis of rotation of a workpiece, a Fourier lens; and an electronic interface unit having an image receiver electrically coupled to an analog-to-digital converter, and connected to an input of a CNC device;

said optical transducer is mounted on a carriage of the machine tool, said reference half plane is located on the side opposite to an apex of the cutting wedge of a tool in relation to the workpiece so as to define an optically transparent slit with a profile surface of the workpiece, and the length of the reference half piece is equal to a nipping radius of the beam of the laser ensuring a two-mode generation;

said electronic interface unit further comprising a memory, switching circuit, a differentiating circuit, and a pulse former; wherein one output of the image receiver is connected to an input of the analog-to-digital converter, a second output of the image receiver is connected to an input of the memory and also to an input of the differentiating circuit, a third output of the image receiver is connected to another output of the differentiating circuit and also to an input of the pulse former, a second input of the pulse former is connected to an output of the differentiating circuit, the output of the pulse former is connected to one input of the switching circuit, another input and an output of the switching circuit are connected to the output of the memory and the other input of the analog-to-digital converter, respectively.

* * * * *